June 21, 1949. H. KOCH Re. 23,125

BONE CONDUCTION HEARING AID

Original Filed Dec. 31, 1941

INVENTOR.

BY Henry Koch

Campbell, Brumbaugh & Free

ATTORNEYS

Reissued June 21, 1949 Re. 23,125

UNITED STATES PATENT OFFICE 23,125

BONE CONDUCTION HEARING AID

Henry Koch, Huntingdon, Pa., assignor to Dictograph Products Company, Inc., New York, N. Y., a corporation of Delaware Original No. 2,405,433, dated August 6, 1946, Serial No. 425,039, December 31, 1941. Application for reissue June 28, 1947, Serial No. 757,799

10 Claims. (Cl. 179—107)

This invention relates to audiphones and has particular reference to audiphone receivers having a vibrating contactor adapted to be placed in operative connection with the bone structure of the user for transmitting audible sounds picked up by a suitable microphone to the inner ear through the bone structure.

Bone conduction receivers may be divided into two general classes, direct acting and reaction. In the former the bone contactor is directly connected to the vibrating element, such as a reed, of an electromagnetic system, the magnet structure of which is held relatively stationary by a headband or the like, so that the contactor vibrates relatively thereto. In the reaction type of receiver, the bone engaging contactor connected to the vibrating element, such as a reed, is supported by a headband or the like, so that the electromagnetic system hangs free and, inasmuch as this system has substantial mass, it remains stationary while the contactor vibrates relatively thereto by reaction.

Each class of bone conduction receiver has certain advantages over the other, as well as certain disadvantages. Thus, inasmuch as the reaction type of receiver vibrates bodily as a unit, it necessarily also vibrates the connecting portion of the headband as well, which imposes some restraint on the vibration requiring increased mass against which the reed may react, thus requiring considerable power for operation.

The direct acting bone receiver does not require vibration of the headband since only the reed and contactor are vibrated, but the necessary pressure of the contactor against the bone in order to obtain good conduction is considerable, and that results in suppression of the reed or diaphragm to which the contactor is connected and variation of the air gap. This objection to direct action receivers is largely overcome in the improvement disclosed in my Patent No. 2,144,458, in which the contactor, forming part of the casing wall engaging the body, is carried by the reed, which is made sufficiently stiff to resist deformation and consequent varying of the air gap under headband normal pressures.

Nevertheless, under abnormal conditions, a greater pressure is applied to the button, sometimes on the order of a pound or more, so that the stiff reed cannot withstand this abnormal pressure and is flexed with consequent variance of the air gap and inefficient and ineffective reproduction. In one form of the invention of my said patent, resilient material, such as rubber or felt is interposed between the contactor and the casing carrying the magnetic structure so that even under abnormal pressures on the contactor the air gap is not varied sufficiently to impair operation of the device. However, even though this cushion is resilient, it affects normal electromagnetic vibration and is not entirely satisfactory.

The present invention is concerned with improvements on the direct-acting bone receiver disclosed in my said Patent No. 2,144,458, in which the general characteristics of the receiver there disclosed are retained and the disadvantage of susceptibility to abnormal pressures of the contactor against the head is eliminated. This is accomplished in a preferred embodiment of the present invention by resiliently mounting the entire magnetic structure in the casing by spring means softer or less resistant to flexing than the stiff reed, i. e., which will flex before the reed flexes under abnormal pressures, so that the entire electromagnetic system floats within the casing to be restored to its normal position by the spring means when the abnormal pressure is released, without impairment in its operation during the period of abnormal pressure.

The receiver of this invention is also preferably mounted directly on the headband which lies flatwise against the head so that any pressure against the headband will not change the position of the electromagnetic structure resiliently supported within the casing in the manner described.

For a more complete understanding of the invention, reference may be had to the accompanying drawing, in which.

Figure 1:
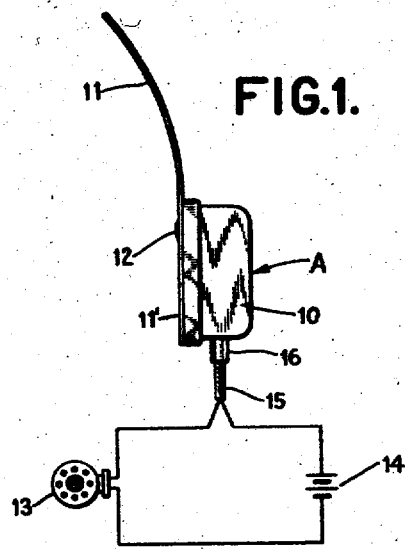
Figure 1 illustrates the bone conduction receiver of this invention supported on a headband and connected in a microphone circuit.

Referring to Fig. 1, the bone conduction receiver A includes a casing 10 of hard rubber, phenolic resin, or the like, mounted on a headband 11, which forms a closure for the corresponding open side of the casing 10 and also serves as a face plate for the receiver A as it is held flatwise against the head. Projecting slightly beyond the surface of the face plate 11' is a bone-engaging contactor or button 12, which is vibrated by electrical means within the casing 10 so as to transmit its vibrations through the intervening bone to the inner ear of the user. The electrical means is energized by voice currents picked up by a suitable microphone 13 in circuit with a battery or other source of power 14 and preferably a vacuum tube or carbon booster amplifier, not shown, connected to the electrical means within the casing A by the flexible electric cord 15 having the separable plug type connectors 16 plugged into the casing 10.

The aforementioned electrical means within the casing 10 may be electromagnetic, a piezo-electric crystal, or any other means responsive to energization by voice currents to produce sufficiently powerful vibrations for intelligible transmission through the bone to the inner ear. Electromagnetic means are shown in the drawings by way of illustration of the invention, and in Fig. 2 comprises a bar magnet 17 resiliently supported within the casing 10 by means of a leaf spring 18 secured at one end thereto by screws 19 and at its other end to the face plate 11', as by bolts 20 countersunk in the face plate 11'.

Also secured to the same end of the bar magnet 17 is the reed 21, having a generally L shape and forming at its free end a narrow air gap 22 with the opposed end of the pole shoe 23 secured to the other end of the bar magnet 17 by screws 24 and carrying the voice coil 25. The reed 21 and the magnet 17 are free of and spaced from face plate 11' and casing 10, respectively.

Voice coil 25 is connected to connector plugs 16 by filaments 26 soldered to studs 27 on conductor plates 28 insulated from headband 11 and connected through springs 29 and friction buttons 30 to the plugs 16.

Secured to the free end of the reed 21 is a contactor button 12 whose outer surface projects only slightly beyond the skin engaging surface of face plate 11'. For a small area contactor 12 as shown such slight projection is desired in order that the skin beneath it will be compressed slightly more than the surrounding skin beneath the face plate 11', so that the skin is firm and hence more conductive of the vibrations at the point of application thereof.

The average degree of skin compressibility, over the mastoid eminence, for example, is such that the projection of the contactor 12 beyond the face plate 11' need not exceed from 1/64 to 1/32 of an inch, so that the button is substantially flush with the face plate. The degree of projection of the contactor in the drawings is shown exaggerated in the interest of clarity. It will be understood that where the contactor constitutes a large part or all of the area of the face plate, as shown in my aforementioned patent, there will be less or no projection of the contactor beyond the face plate, because the need for localized skin compression decreases as the area of the contactor increases.

The contactor 12 extends through a hole in the face plate 11', which is sufficiently oversize that there is no contact between the contactor 12 and the face plate 11'. The consequent narrow annular slot around the contactor 12 is sealed by a ring of felt 31 against ingress of moisture, dirt and the like, this ring 31 being clamped between the contactor 12 and the reed 21.

The air gap 22 has a width on the order of a few thousandths of an inch and the reed 21 is thick and consequently stiff, so that a force on the contactor 12 in excess of normal headband pressures, i. e., greater than about five ounces, is necessary in order to deflect the reed 21 sufficiently to affect the air gap 22. Thus, if the stiffness selected for reed 21 is such that a force of eight ounces is necessary to deflect it at the air gap, the stiffness of spring 18 is made such that it flexes before the reed 21 is flexed, e. g., when a pressure in excess of six to seven ounces is applied to the contactor 12. These degrees of stiffness are predicated on normal headband pressures in the neighborhood of five ounces, so that a pressure in excess thereof is abnormal. Obviously, if the normal headband pressure is greater or less than that in the given example, the reed 21 will be made stiffer or softer, as the case may be, and spring 18 will always bemade to flex under a contactor pressure somewhat less than that required to deflect the reed 21.

Figure 2:
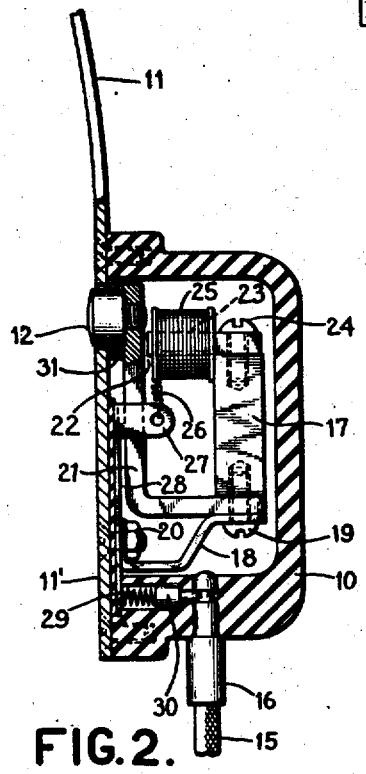
Fig. 2 is a longitudinal section through the receiver illustrating the interior construction thereof.

In operation of the bone conduction receiver illustrated in Figs. 1 and 2, the face plate 11' is held firmly against the head, such as on the mastoid eminence, by the headband 11, with a normal pressure of five ounces. The contactor 12 does not move under this pressure because the stiffness of the reed 21 is such that a greater pressure is required on the contactor 12 before the reed is flexed. Consequently the contactor compresses the skin beneath it slightly more than does the surrounding skin-engaging portion of the face plate 11', so that a firm vibration conducting coupling between it and the bone is provided. Energization of the electromagnetic system results in vibration of the contactor 12 relatively to the headband 11 and casing 10 and transmission of its vibrations through the intervening bone to the inner ear.

If the pressure on the contactor 12 is increased abnormally, as when the user presses on the casing 10 while it is on his head, or presses his finger on the contactor 12 while the receiver is not on his head, the spring 18 will flex, allowing the contactor 12 to recede into the casing, the entire magnet system moving therewith without any flexing of the reed 21. Even when the device is in use and the casing is pressed against the head or a tight hat placed over the headband 11 producing a similar effect, the operation of the receiver is not impaired.

By securing the casing 10 to the headband 11, as shown, so that a large area of the latter engages the head, the effect of pressure on the headband, as by a tight hat, is minimized and usually precluded. This advantage is not possible with headbands of the pivoted fork type shown in my said patent, where the headband is spaced from the head and hence is more susceptible of movement and consequent suppression of the contactor under abnormal pressures. It will be understood that this arrangement of headband co-extensive with or continuous with the face plate may be employed with advantage on any type of bone receiver, such as those described in my said patent.

Figure 3:
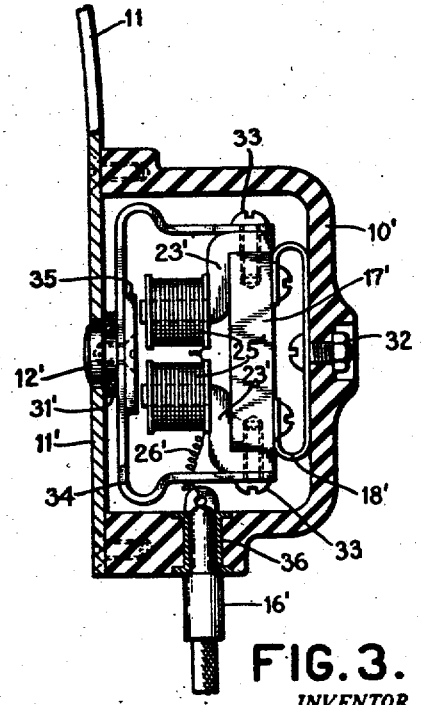
Fig. 3 is a longitudinal section through a modified form of the receiver of this invention.

In the modified form of the invention shown in Fig. 3, the bar magnet 17' is suspended by a spring 18' from the inside of the casing 10 to which spring 18' is secured by bolts 32 located opposite the center of the magnet 17'. Secured to opposite ends of magnet 17' by screws 33 is a U-shaped spring 34 carrying at its center the armature 35 screwed to contactor 12', which may be a hard rubber button or other non-metallic material. Pole shoes 23' also secured to the ends of the bar magnet 17 by the screws 33 form narrow air gaps with the armature 35 and carry the voice coils 25' connected in the microphone circuit through filaments 26′, bushings 36, and connectors 16′.

The contactor projects slightly beyond the surface of the face plate 11″, which is coextensive with the headband 11, and a felt washer 31′ seals the annular space between the perimeter of the contactor 12′ and the hole therefor in the face plate 11′. As before, the spring 34, which corresponds to the reed 21 of Fig. 1 as a spring, is sufficiently stiff that it does not flex under pressures of button 12′ on the bone equal to normal or slightly greater, depending upon requirements. However, spring 18′ is softer than spring 34, so that it flexes under abnormal pressures on contactor 12′, allowing the entire electromagnetic structure to move inwardly until equilibrium is obtained. When the pressure is released the system is restored by spring 18′, without impairment of the operation of the receiver during this interval of abnormal pressure. The arrangement of Fig. 3 differs from that of Fig. 2 in that the flux paths are shorter and the movement under abnormal pressure is in the direction of the pressure instead of about spring 18′ as a form of pivot in Fig. 2. The operation is the same in each case.

It will be seen that the present invention provides a simple and effective solution to the problem of operation of bone conduction receivers, while preserving the advantages thereof, and while certain preferred embodiments of the invention have been illustrated and described herein, it is to be understood that they are merely illustrative and do not limit the invention within the scope of the claims.

I claim:

1. In an audiphone receiver, the combination of an electromagnetic means adapted to respond to varying currents substantially throughout the audible frequency range, a casing having a face plate adapted to engage the body of the user, a contactor forming at least part of the body-engaging surface of said face plate and vibrated by said electromagnetic means relatively to said casing, relatively stiff spring means connecting said contactor and electromagnetic means, and resilient means connecting said electromagnetic means directly connected to said casing and supporting said electromagnetic means, spring means and contactor for bodily movement of the same as a unit relatively to said face plate in response to excessive pressures applied to said contactor, said resilient means having a stiffness less than that of said spring means.

2. In an audiphone receiver, the combination of an electrical means adapted to respond to varying currents substantially throughout the audible frequency range, a casing having a face plate adapted to engage the body of the user, a contactor forming at least part of the body-engaging surface of said face plate and vibrated by said electrical means relatively to said casing, relatively stiff spring means connecting said contactor and electrical means, means supporting said face plate and contactor in simultaneous connection with the bone structure of the user with a predetermined pressure less than that required to substantially flex said spring means, and resilient means directly connecting said electrical means to said casing and supporting said electrical means, spring means and contactor and said supporting means for bodily movement of the same as a unit relatively to said face plate under pressure on said contactor greater than said predetermined pressure.

3. In an audiphone receiver, the combination of an electrical means adapted to respond to varying currents substantially throughout the audible frequency range, a casing enclosing said electrical means, a headband secured to said casing and forming a wall thereof engaging the body of the user with a predetermined pressure, resilient means directly connecting said electrical means to said casing for bodily movement relatively thereto, said resilient means having a stiffness precluding substantial flexing under pressures approximately equal to said predetermined pressure, a contactor vibrated by said electrical means and extending through said wall for engaging the body of the user simultaneously with said wall, and spring means connecting said contactor to said electrical means and having a stiffness greater than that of said resilient means, whereby pressure on said contactor in excess of said predetermined pressure causes flexing of said resilient means and bodily movement of said electrical means, spring means and contactor as a unit relatively to said casing.

4. In an audiphone receiver, the combination of an electrical means adapted to respond to varying currents substantially throughout the audible frequency range, a headband having a relatively flat portion adapted to engage the head of the user, a casing for said electrical means having a wall coextensive with said headband portion, and a contactor vibrated by said electrical means and adapted to engage the head of the user simultaneously with said headband portion.

5. In an audiphone receiver, the combination of an electrical means adapted to respond to varying currents substantially throughout the audible frequency range, a headband having a relatively flat portion adapted to engage the head of the user, a contactor vibrated by said electrical means and substantially flush with said headband portion for transmitting its vibrations through the bone to the inner ear, and a casing for said electrical means mounted on said headband.

6. In an audiphone receiver, the combination of electro-magnetic means adapted to respond to varying currents substantially throughout the audible frequency range, said electromagnetic means comprising a unit including a magnet structure, voice coil, vibratory armature, a relatively stiff spring connecting said armature and magnet structure and a contactor connected to said armature for vibration therewith, a casing for said electromagnetic means, said contactor forming at least part of a wall of said casing, resilient means directly connecting said magnet structure to said casing and having less stiffness than said spring, whereby excessive pressure on said contactor causes said resilient means to flex to permit bodily movement of said electromagnetic means as a unit relatively to said casing.

7. In an audiphone receiver, the combination of electromagnetic means adapted to respond to varying currents substantially throughout the audible frequency range, said electromagnetic means comprising a unit including a magnet structure, voice coil, vibratory armature, a relatively stiff spring connecting said armature and magnet structure and a contactor connected to said armature for vibration therewith, a headband having an aperture for said contactor, a casing for said electromagnetic means mounted on said headband, said headband forming a wall of the casing, and resilient means directly connecting said magnet structure to said casing and having a stiffness less than said spring, whereby said electromagnetic means moves bodily as a unit in said casing in response to excessive pressures on said contactor.

8. In an audiphone receiver, the combination of electromagnetic means adapted to respond to varying currents substantially throughout the audible frequency range, said electromagnetic means comprising a unit including a magnet structure, voice coil, vibratory armature, a relatively stiff spring connecting said armature and magnet structure and a contactor connected to said armature for vibration therewith, a headband having an aperture for said contactor, a casing for said electromagnetic means mounted on said headband, said headband forming a wall of the casing, and a second spring directly connecting said magnet structure to said headband and affording bodily movement of said electromagnetic means as a unit relatively to said casing in a direction opposite to that of application of the contactor to the body of the user, said second spring having less stiffness than said first spring.

9. In an audiphone receiver, the combination of a vibrating mechanism comprising two members, relatively stiff spring means connecting said members and permitting relative movement between at least portions of both members, electrical means adapted to respond to varying currents within the audible frequency range secured to said portion of one of said members and operatively opposed to said portion of the other member for relatively vibrating the latter, a contactor connected to the said portion of said other member for vibration therewith, a resilient headband for holding said contactor in engagement with the body of the user with a predetermined pressure, and a leaf spring having less stiffness than said spring means directly connecting said other member to and supporting the same on said headband, whereby the said portion of said member and the contactor are free to vibrate relatively to said other member and the headband and said leaf spring flexes to permit bodily movement of said vibrating mechanism and contactor relatively to said headband in response to excessive pressure on said contactor without suppressing the vibration of said portion of said one member and contactor.

10. In an audiphone receiver, the combination of a vibrating mechanism comprising two members, relatively stiff spring means connecting said members and permitting relative movement between at least portions of both members, electrical means adapted to respond to varying currents within the audible frequency range secured to said portion of one of said members and operatively opposed to said portion of the other member for relatively vibrating the latter, a contactor connected to the said portion of said other member for vibration therewith, a resilient headband connected to the said portion of said one member and having a normal stiffness less than the stiffness of said spring means for holding said contactor in engagement with the body of the user with a predetermined maximum pressure, and a spring directly interposed in said connection between said headband and the said portion of said one member and having greater stiffness than said normal stiffness of said headband but less stiffness than said spring means, whereby pressure of said contactor in excess of said predetermined maximum pressure causes said spring to flex and permit bodily movement of said vibrating mechanism and relatively to said headband without affecting said spring means.

HENRY KOCH.

No references cited.